Sept. 1, 1964   K. ÅKE A. MAGNUSSON   3,147,367
STEAM BATH APPARATUS
Filed Dec. 17, 1963
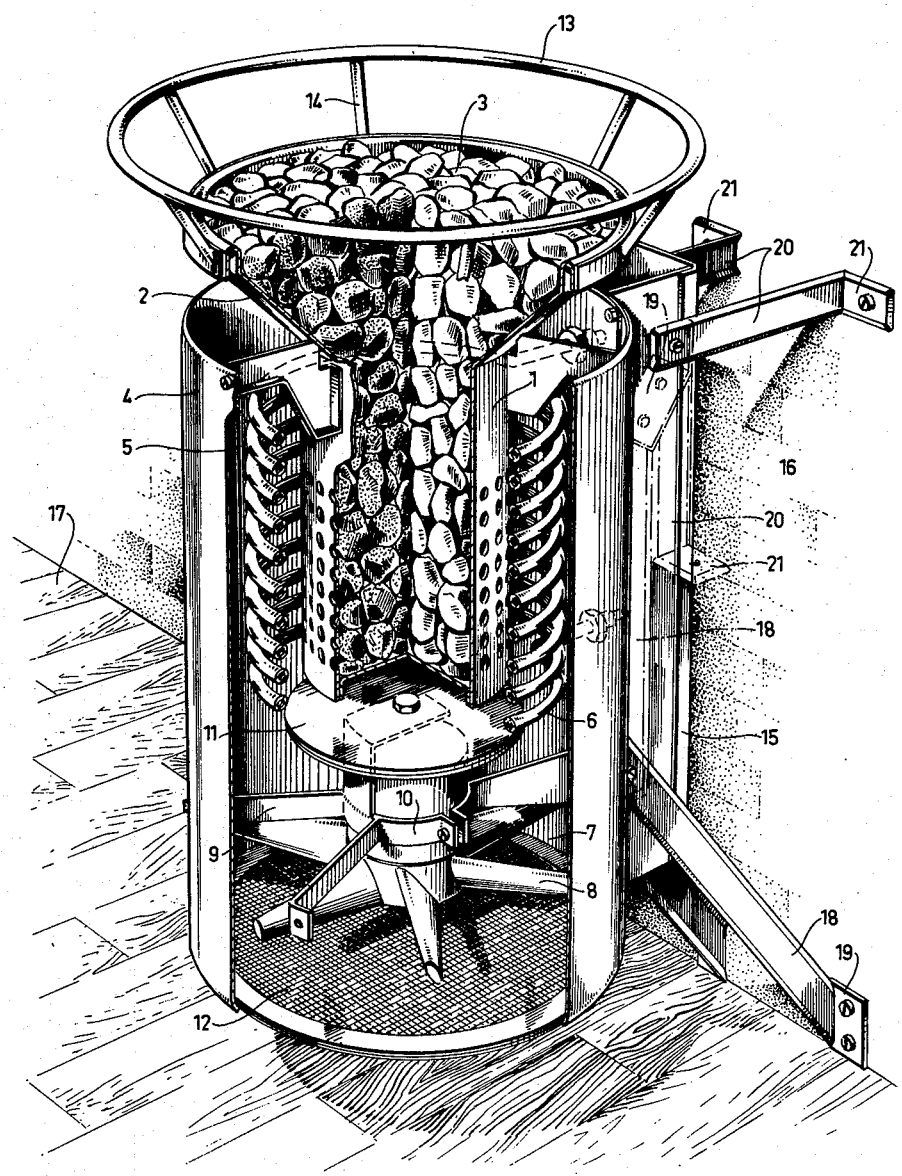
INVENTOR
Kurt Åke Arvid Magnusson
BY Stevens, Davis, Miller & Mosher
ATTORNEYS

United States Patent Office 3,147,367
Patented Sept. 1, 1964

3,147,367
STEAM BATH APPARATUS
Kurt Åke Arvid Magnusson, Enköping, Sweden, assignor to Aktiebolaget Bahco, Stockholm, Sweden, a corporation of Sweden
Filed Dec. 17, 1963, Ser. No. 331,206
1 Claim. (Cl. 219—366)

The present invention relates to an electrical steam bath apparatus.

One object of the invention is to obtain an efficient heating of the stone material for making it possible to get the desired steam bath.

Another object of the invention is to enable a simple mounting of the apparatus and simultaneously ensure that it is automatically placed at a sufficient distance from the adjacent walls and roof.

A further object of the invention is to prevent an unintentional covering of the outlets for the outflowing heated air.

A further object of the invention is to reduce the space necessary for the transport of the apparatus.

All the above mentioned objects are obtained by the present invention according to which the steam bath apparatus comprises a substantially cylindrical container open at its upper end and having a circumferential wall at least partly perforated and adapted to contain stone material to be heated, a substantially cylindrical jacket surrounding said container concentrically, said jacket having such a diameter that an annular passage for air to be heated is formed between said jacket and said container, at least one electrical heating element helically surrounding said container and provided within said passage, said jacket extending downwardly beyond the bottom of said container to form a free space below said container, said space containing a motor-fan unit below said container, a sheet-like radiation protecting means between said container and said motor-fan unit to protect the motor from radiating heat from said heating element, an upwardly open funnel-like member fitted around the upper end of said container to form an extension of said container and serving to deflect the air passed by the fan through said annular passage and heated therein by said heating elements upwardly and outwardly, the largest diameter of said funnel-like member being substantially equal to the diameter of said jacket, a protecting member detachably mounted on the upper end of said funnel-like member and consisting of a ring of larger diameter than said jacket and carried by spider means, a casing extending along the whole length of said jacket and containing the necessary electrical connecting means, a pair of outwardly and downwardly directed supporting legs detachably mounted one on each side of said casing adjacent its lower end and carrying at their free ends attachment plates for mounting on a wall of the locality, and a pair of substantially horizontal supporting arms pivotally mounted one on each side of said casing adjacent its upper end and provided at their free ends with attachment plates for mounting on on the same wall, said legs and arms having the same extension in the horizontal direction.

The invention is further described in the following in connection with the embodiment shown on the attached drawing in perspective view and partly in section.

On the drawing 1 designates a cylindrical container the circumferential wall of which is perforated and at the upper end of which a funnel-like member 2 is provided. These two parts form together a space for containing stone material 3. The container 1 is surrounded by a cylindrical jacket 4 which is open upwards as well as downwards and the diameter of which is so chosen relatively to the diameter of said container that between said jacket and said container there is formed an annular channel 5 in which an electric heating element 6 is provided which is helically wound around said container but out of contact with said circumferential wall. The jacket which extends downwards beyond the bottom of said container forms below the container a space 7 which contains a motor-fan unit 8 which is disposed concentrically with said container and serves to draw air from the lower open end of said jacket and to blow it through said channel 5. The air then leaves the apparatus at the upper open end of the jacket whereby means of the funnel-like member 2 the air is deflected outwardly and upwardly. A portion of the air passing into said channel and heated by the electric heating element 6 flows into said container 1 through the perforated wall and passes the stone material to heat the same.

The motor-fan unit 8 is carried by a number of radial arms 9 connected to the jacket and also to said unit by means of a clamping member 10. To protect the motor and especially the mountings of the motor from overheating due to the radiation heat from the heating element and from the heated stone material in the container there is provided a disc-like radiation protecting means 11 between said motor and the bottom of said container. To prevent easily combustible particles from being sucked into the apparatus together with the air the lower end of the jacket is covered by a wire-screen 12 or the like.

Detachably mounted on the upper end of the funnel-like member 2 the diameter of which is substantially equal to the diameter of the jacket 4 is a protecting member comprising a ring 13 and spider means 14, the diameter of said ring being larger than that of said jacket so that if an object e.g. a towel is unintentionally placed onto said ring a closing of the out-flow openings of said channel is prevented.

Along the whole length of said jacket extends an elongated casing 15 adapted to contain all connecting means necessary to connect the fan motor and the heating element to the electrical power.

For mounting of the apparatus on a wall 16 of the intended locality and to ensure that the apparatus will be at sufficient distance from said wall and from the floor 17 a leg 18 is detachably connected to each side of said casing 15 near its lower end and the free end of which is provided with an attachment plate 19. In a similar way a supporting arm 20 is pivotally connected to each side of said casing near the upper end thereof and at its free end it is also provided with an attachment plate 21. The legs 18 and the arms 20 have the same extension in the horizontal plane so that when connecting the legs and the arms to the wall the apparatus will automatically have the right position in vertical direction.

Due to the fact that the legs are detachably connected to said casing 15 and further that the arms are pivotally connected to the same, these members, when the apparatus shall be packed during transport, can be placed in the positions shown by the dotted lines and thus the necessary transport space is reduced to a minimum. Contributing to this result is the fact that the protecting member 13, 14 is detachably connected to the funnel-like member 2 as said protecting member when the apparatus is packed can be placed in the most convenient way from this respect.

The invention is not limited to the now shown and described embodiment but may be varied in many ways within the scope of the following claim.

I claim:

Steam bath apparatus comprising a substantially cylindrical container open at its upper end and having a circumferential wall at least partly perforated and adapted to contain stone material to be heated, a substantially cylindrical jacket surrounding said container concentrically, said jacket having such a diameter that an annular passage for air to be heated is formed between said jacket and said container, at least one electrical heating element helically surrounding said container and provided within said passage, said jacket extending downwardly beyond the bottom of said container to form a free space below said container, said space containing a motor-fan unit below said container, a sheet-like radiation protecting means between said container and said motor-fan unit to protect the motor from radiating heat from said heating element, an upwardly open funnel-like member fitted around the upper end of said container to form an extension of said container and serving to deflect the air passed by the fan through said annular passage and heated therein by said heating elements upwardly and outwardly, the largest diameter of said funnel-like member being substantially equal to the diameter of said jacket, a protecting member detachably mounted on the upper end of said funnel-like member and consisting of a ring of larger diameter than said jacket and carried by spider means, a casing extending along the whole length of said jacket and containing the necessary electrical connecting means, a pair of outwardly and downwardly directed supporting legs detachably mounted one on each side of said casing adjacent its lower end and carrying at their free ends attachment plates for mounting on a wall of the locality, and a pair of substantially horizontal supporting arms pivotally mounted one on each side of said casing adjacent its upper end and provided at their free ends with attachment plates for mounting on the same wall, said legs and arms having the same extension in the horizontal direction.

References Cited in the file of this patent

FOREIGN PATENTS

| | | |
|---|---|---|
| 88,578 | Norway | Jan. 14, 1957 |
| 144,697 | Sweden | Mar. 30, 1954 |
| 256,963 | Switzerland | Mar. 16, 1949 |
| 884,956 | Great Britain | Dec. 20, 1961 |